Sept. 30, 1958     C. F. BACHLE     2,854,085
VEHICLE ENGINE AND TRANSMISSION
Filed Feb. 28, 1956
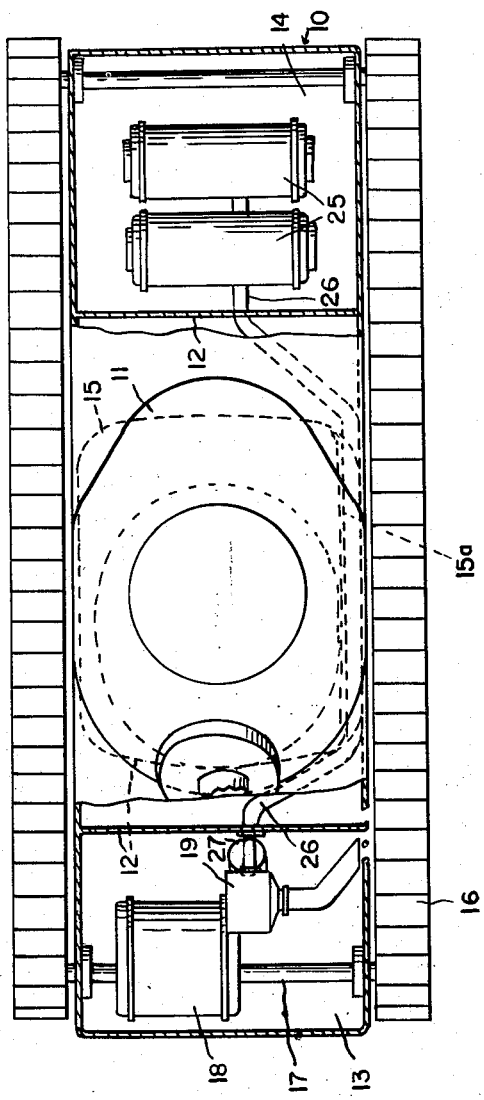
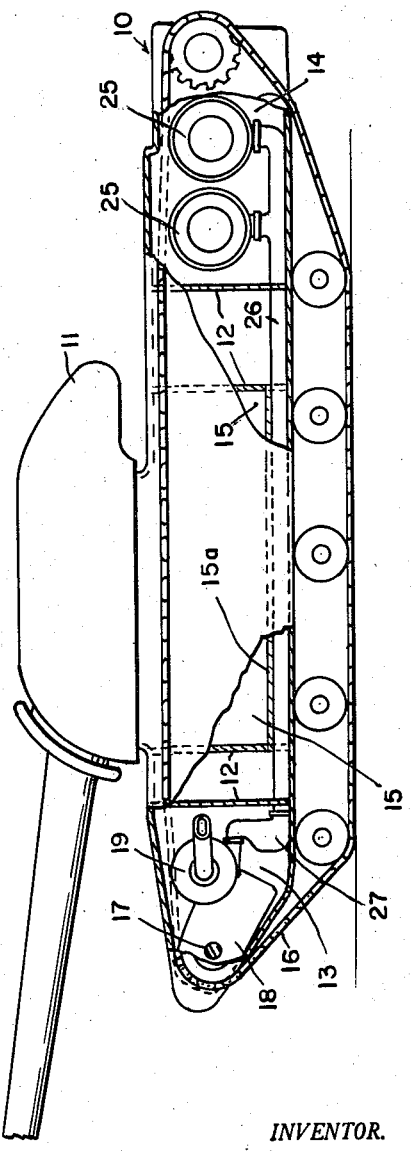
INVENTOR.
CARL F. BACHLE
BY
*Hauke & Hardesty*
ATTORNEYS

United States Patent Office 2,854,085
Patented Sept. 30, 1958

2,854,085

VEHICLE ENGINE AND TRANSMISSION

Carl F. Bachle, Grosse Pointe, Mich., assignor to Continental Aviation & Engineering Corporation, Detroit, Mich., a corporation of Virginia Application February 28, 1956, Serial No. 568,240

2 Claims. (Cl. 180—66)

My invention relates to engine driven vehicles and more particularly to a vehicle and engine assembly comprising a gas pressure turbine driven transmission remotely located in a vehicle from the gas producing engine, and to a transmission and remotely located engine of the free piston gas producer type particularly adaptable to military vehicles such as tanks and other gun carriers.

Heretofore in the construction of military vehicles such as tanks and other gun carriers, functional design has been somewhat limited by the prime considerations of engine and transmission relationships. The use of conventional engine to transmission driving means generally imposes limitations on the overall design of the vehicle, such as by increasing height, width, or length beyond that which is functionally desirable.

An object of the present invention is to improve vehicle operation by providing a more compact, lighter, and more powerful power source therefor.

Another object of the invention is to simplify vehicle design and construction by providing a gas turbine driven transmission powered by a free piston gas producer having appreciably less bulk and weight than other engines of equidistant power.

A further object of the invention is to utilize available vehicle space more efficiently by providing a free piston gas producing engine remotely located in the vehicle from the gas turbine driven transmission which is powered by the engine.

For a more complete understanding of my invention, reference may be had to the accompanying drawing illustrating a preferred embodiment of the invention in which like characters refer to like parts throughout the several views and in which:

Fig. 1 is a side elevational view of a vehicle, partly cut away to illustrate the present invention, and Fig. 2 is a top plan view of the vehicle partly cut away.

The drawings illustrate a vehicle preferably a tank or other military gun carrier having a turret 11. The interior of the vehicle has bulkheads 12 which provide the vehicle with three principal compartments; namely, a forward compartment 13, a rear compartment 14, and a central operator's compartment 15, which communicates with the turret 11.

A traction means such as a track assembly 16 is supported on the vehicle and preferably driven by a forward drive shaft or driving means 17, which extends transversely through the forward compartment 13. A transmission assembly 18 is preferably located in the forward compartment 13 and is drivingly connected to the driving means 17. A gas pressure operated turbine 19 also disposed in said compartment 13 powers the transmission assembly 18.

A gas producing means comprising one or more free piston gas producer engines 25 is preferably installed in the rear compartment 14. Gas generated in the engines 25 is conducted from the rear to the forward compartment through a conduit means 26, connecting the engines 25 and the turbine 19. A reheater 27 may be mounted integrally with the reheater conduit means 26 in the forward compartment 13. In the reheater 27, additional fuel is added to the gas and burned, and the gas under pressure and velocity is then fed to the turbine 19.

It will be noted that the central operator's compartment 15 is preferably recessed as at 15a at the left side (looking forward in Fig. 2) so that the conduit means 26 may bypass the central compartment 15 as illustrated in Fig. 2. The conduit means 26 is protected by the armored left side of the vehicle.

The arrangement of engines and transmission described is only a preferred one. The transmission may be located in the rear and the engines in the front compartment if desired. The important consideration is that the engines 25 are remotely located from the transmission, assembly 18, the turbine 19, and the reheater 27 and all aforesaid components are isolated from the central operator's compartment 15.

Although I have described but one preferred embodiment of my invention, it will be apparent to one skilled in the art to which the invention pertains that various changes and modifications may be made therein without departing from the spirit of the invention or the scope of the appended claims.

I claim:

1. A military vehicle having substantially vertical bulkheads providing the vehicle interior with a forward end compartment, a rear end compartment, and a medial operator's compartment occupying substantially the full vertical dimension of said vehicle interior, said compartments being spaced from and isolated from each other, traction means for said vehicle, a transmission assembly located in one of said end compartments, a driving means connecting said transmission assembly to said traction means, a gas pressure operated turbine means associated with said transmission assembly and drivingly connected therewith, a gas producing means located in the other of said end compartments the bulkheads enclosing said operator's compartment having a laterally offset portion constructed to form a longitudinal recess providing a passageway extending exteriorly of said operator's compartment, and longitudinally extending conduit means for conducting gas under pressure from said gas producing means to said turbine means, said conduit means extending from said forward compartment through the spaces between said compartments and through said passageway to said rear compartment, said passageway being offset laterally to bypass and to be isolated from said medial operator's compartment.

2. A military vehicle having substantially vertical bulkheads providing the vehicle interior with a forward end compartment, a rear end compartment, and a medial operator's compartment occupying substantially a full vertical dimension of said vehicle interior, said compartments being spaced from and isolated from each other, traction means for said vehicle, a transmission assembly located in one of said end compartments, driving means connecting said transmission assembly to said traction means, a gas pressure operated turbine means associated with said transmission assembly and drivingly connected therewith, a gas producing means located in the other of said end compartments the bulkheads enclosing said operator's compartment having a laterally offset portion constructed to form a longitudinal recess providing a passageway extending exteriorly of said operator's compartment, and longitudinally extending conduit means for conductiong gas under pressure from said gas producing means to said turbine means, said conduit means extending from said forward compartment through the spaces between said compartments and through said passageway to said rear compartment, said passageway being offset laterally to bypass and to be isolated from said medial operator's compartment, said transmission assembly and said turbine means disposed in said forward compartment, and said gas producing means disposed in said rear compartment.

References Cited in the file of this patent

UNITED STATES PATENTS 2,554,593   Sedille ---------------- May 29, 1951

FOREIGN PATENTS

| | | |
|---|---|---|
| 825,962 | France | Dec. 27, 1937 |
| 912,401 | France | Apr. 29, 1946 |
| 1,066,674 | France | Jan. 20, 1954 |
| 1,078,643 | France | May 12, 1954 |
| 728,245 | Great Britain | Apr. 13, 1955 |
| 456,636 | Italy | Apr. 17, 1950 |